United States Patent [19]
Asghar et al.

[11] Patent Number: 5,347,480
[45] Date of Patent: Sep. 13, 1994

[54] DIGITAL SIGNAL PROCESSING APPARATUS

[75] Inventors: Safdar M. Asghar; John G. Bartkowiak, both of Austin; Michael A. Nix, Buda, all of Tex.

[73] Assignee: Advanced Micro Devices, Inc., Sunnyvale, Calif.

[21] Appl. No.: 53,959

[22] Filed: Apr. 27, 1993

Related U.S. Application Data

[63] Continuation of Ser. No. 783,899, Oct. 29, 1991, abandoned.

[51] Int. Cl.$^5$ .............................................. G06F 15/00
[52] U.S. Cl. .................................................. 364/736
[58] Field of Search ............... 364/736, 741, 751, 754

[56] References Cited

U.S. PATENT DOCUMENTS

| | | | |
|---|---|---|---|
| 4,507,728 | 3/1985 | Sakamoto et al. | 364/736 X |
| 4,682,302 | 7/1987 | Williams | 364/754 X |
| 5,053,631 | 10/1991 | Perlman et al. | 364/736 X |

Primary Examiner—Jerry Smith
Assistant Examiner—Chuong D. Ngo
Attorney, Agent, or Firm—Foley & Lardner

[57] ABSTRACT

An apparatus for processing a received signal according to a digital signal processing algorithm having a multiplier and a limit and quantization circuit appropriately connected within the apparatus to permit operation of the multiplier and the limit and quantization circuit in parallel with logic processing by the apparatus. The address bus system of the apparatus is connected to the parallel-connected components and conveys instructions to the parallel-connected components, at least in part, by predetermined address information via the address bus system.

1 Claim, 1 Drawing Sheet

DIGITAL SIGNAL PROCESSING APPARATUS

This application is a continuation of application Ser. No. 07/783,899 filed on Oct. 29, 1991, now abandoned.

BACKGROUND OF THE INVENTION

The present invention generally relates to a digital signal processing apparatus for performing digital signal processing operations on a received signal according to a digital signal processing algorithm.

Digital signal processing apparatuses find application in many different kinds of digital systems such as, for example, calculators and digital telephones. Digital signal processing operations are generally performed on multiple-bit operands and may include operand shifts, operand masks, force zero, operand addition, operand subtraction, operand multiplication and overflow detection and correction.

Digital multiplication and accumulation are often required of digital signal processors for many applications. One such application is in the implementation of Recommendation G.721 for use in cordless portable telephony. One function required in Recommendation G.721 is the performance of eight serial multiplications of eight different pairs of first and second multiple-bit binary operands and the accumulation of the multiplication products. In addition, Recommendation G.721 requires, to perform this function, one set of operands to be in floating point format, the second set of operands to be in fixed point format, and the accumulated product to be in fixed point format.

Digital signal processing apparatuses generally perform such operations under the control of operating instructions received from an instruction memory such as an instruction read only memory (IROM). Each instruction provided by the instruction memory corresponds to one operating cycle of the digital signal processing apparatus. The number of operating cycles required by a digital signal processing apparatus to perform its operations is very important and should be kept to the lowest number of operating cycles possible for high efficiency processing.

High efficiency digital signal processing apparatus performance is most desirable where operating speed is of importance, such as in portable equipment which is powered by a depletable power source such as a battery. As the number of operating cycles required by a digital signal processing apparatus to perform its operations is reduced, the power consumption of the depletable power source attributable to the digital signal processing apparatus is correspondingly reduced. This, as a result, extends the time of operation of the portable equipment before battery replacement or battery recharging is necessary.

The present invention provides an improved digital signal processing apparatus for performing a number of different digital arithmetic operations in an efficient manner thus requiring a reduced number of operating cycles. Speed of processing is further enhanced in the preferred embodiment of the present invention by connecting a multiplier and a limit and quantization circuit appropriately within the apparatus to permit operation of the multiplier and the limit and quantization circuit in parallel with logic processing by the apparatus. The number of instruction bits would be required to be increased by prior art digital signal processors in order to accommodate such parallel operations since additional instructional information would be required to control multiple simultaneous (i.e., parallel) operations. Such an increase in instruction bits is avoided by the preferred embodiment of the present invention by connecting the address bus system of the apparatus to the parallel-connected components and conveying instructions to the parallel-connected components, at least in part, by predetermined address information via the address bus system.

SUMMARY OF THE INVENTION

The present invention provides an apparatus for processing received signals according to a digital signal processing algorithm, which algorithm is implemented by a plurality of instructions. The apparatus includes a control circuit for controlling operation of the apparatus and for issuing the instructions on an instruction bus system according to a predetermined program. Further included in the apparatus is a logical processing circuit for effecting logical processing of the received signal in response to first selected instructions of the plurality of instructions; the logical processing circuit is operatively connected with the instruction bus system and includes a plurality of data buses for passing data within the apparatus, the received signal being received by at least one data bus of the plurality of data buses. The invention further includes a multiplying circuit for multiplying numbers, which is operatively connected with the instruction bus system; the multiplying circuit effects multiplication in response to second selected instructions of the plurality of instructions. Further, the multiplying circuit is operatively connected with at least two data buses of the plurality of data buses in a manner appropriate to enable the multiplying circuit to operate substantially in parallel and substantially simultaneously with the logical processing circuit. Also included in the apparatus is a plurality of register units for storing information, each of which register units effects such storing in a predetermined storage location in response to an address indicator signal identifying the predetermined storage location. The address indicator signal is received by respective register units via an address bus system according to the predetermined program. The plurality of register units is responsive to third selected instructions of the plurality of instructions, which third selected instructions are received from the control circuit via the instruction bus system.

The second selected instructions which control operation of the multiplier are at least partially represented by predetermined address information which is conveyed to the multiplier from the control circuit via the address bus system.

The apparatus may also further include a limit and quantization circuit for quantizing data and determining limits of data conveyed to it. The limit and quantization circuit is operatively connected with the instruction bus system and effects its operations in response to fourth selected instructions of the plurality of instructions. The limit and quantization circuit is operatively connected with at least two data buses of the plurality of data buses in a manner appropriate to enable the limit and quantization circuit to operate substantially in parallel and substantially simultaneously with the logical processing circuit. The fourth selected instructions which control operation of the limit and quantization circuit are at least partially represented by specified address information which is conveyed from the control circuit to the limit and quantization circuit via the address bus system.

BRIEF DESCRIPTION OF THE DRAWING

The features of the present invention which are considered to be novel are set forth with particularity in the appended claims. The invention, together with further objects and advantages thereof, may best be understood by making reference to the following description taken in conjunction with the accompanying drawing, and wherein:

DETAILED DESCRIPTION

Figure 1:
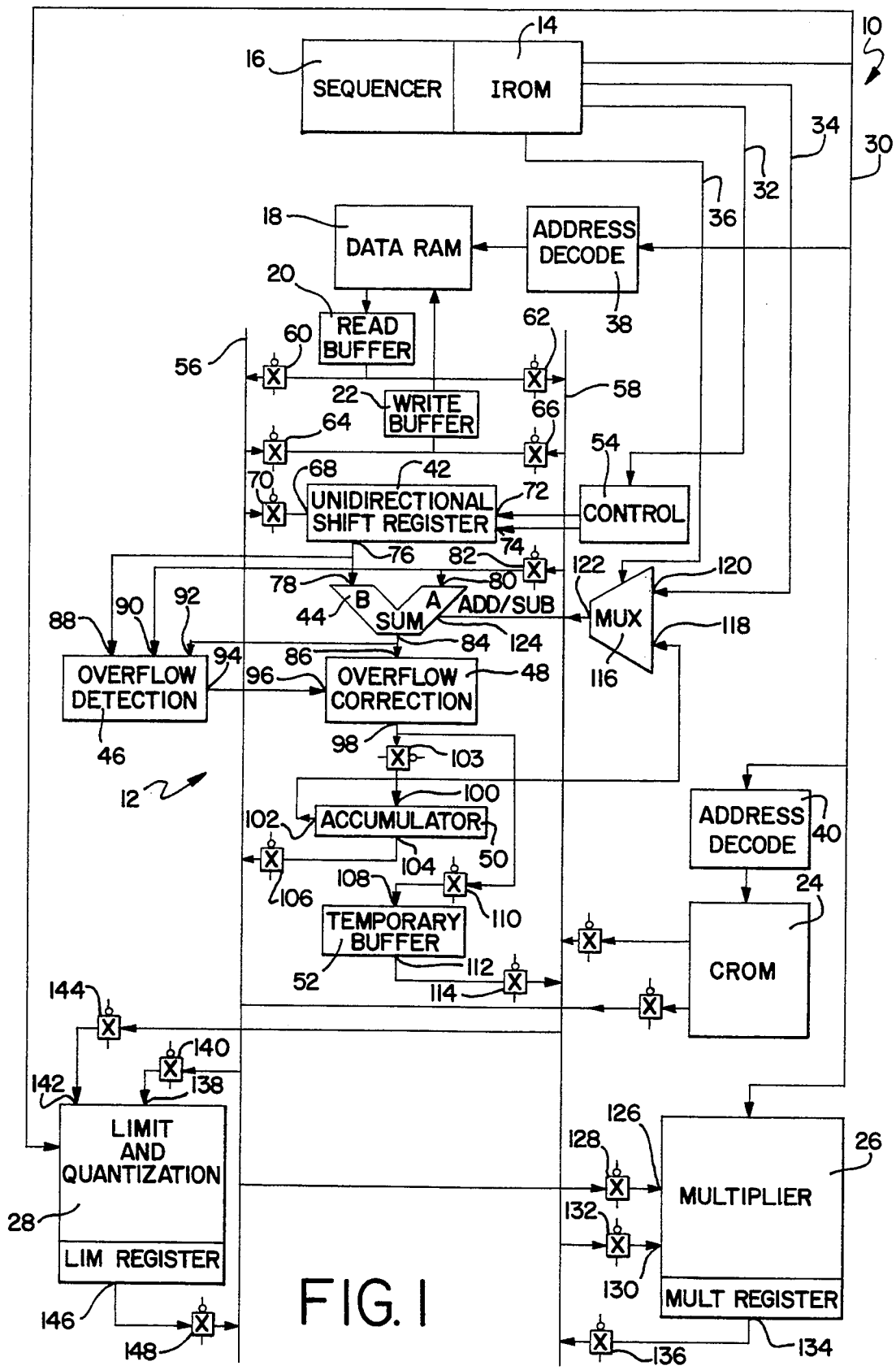
FIG. 1 is a schematic block diagram of the preferred embodiment of a digital signal processing apparatus according to the present invention.

Referring now to FIG. 1, it illustrates, in schematic block diagram form, a digital signal processing apparatus 10 incorporating an arithmetic logic unit 12, an instruction memory (IROM) 14 and an associated sequencer 16, a data memory 18, a read buffer 20, a write buffer 22, a constants memory 24, a multiplier section 26, and a limit and quantization section 28.

Digital signal processor 10 performs digital signal processing under the control of the instruction memory 14 which provides an operating instruction during each operating cycle of digital signal processing apparatus 10. Instruction memory 14 is sequenced by sequencer 16 for issuing operating instructions one at a time under the control of sequencer 16. The instructions are provided by instruction memory 14 over an 8-bit address bus 30, a 3-bit shift/mask control bus 32, and control lines 34 and 36. Address bus 30 is coupled to an address decoder 38 which decodes addresses for data memory 18, an address decoder 40 which decodes addresses for constants memory 24, multiplier section 26, and limit and quantization section 28. Control line 34 provides a control signal for causing multiple-bit data to be two's compliment inverted on input 78 of summer 44, and control line 36 provides an enable signal which is utilized by multiplexer 116.

Address bus 30 is connected with multiplier section 26 and limit and quantization section 28 in order that multiplier section 26 and limit and quantization section 28 may receive address information. By configuring multiplier section 26 and limit and quantization section 28 to operatively respond to specified preselected address information, no additional instruction bits need be accommodated by an instruction bus system (not shown in its entirety; represented by control bus 32 and control lines 34, 36) to effect parallel operation of multiplier section 26 and limit and quantization section 28 with arithmetic logic unit 12. That is, the very same particular bits of a multibit address may operate in the manner of an instruction for more than one apparatus. Thus, if there were for example eight bits in an address conveyed on address bus 30 to a plurality of elements of apparatus 10 (e.g., to multiplier section 26, to quantization section 28, and to data memory 18), the four most significant bits of the eight-bit address could be interpreted as a different operational instruction by each such element receiving that address. It is in this manner that parallel operation of multiplier section 26, of quantization section 28, and of data memory 18 may be effected. Such operations may truly be effected simultaneously in the sense that they may occur simultaneously (i.e., during the same clock cycle) since the same address/instruction bits are received by the various elements 18,26,28 of apparatus 10 in the same clock cycle via the same address bus 30 and are simultaneously interpreted independently by the various elements 18,26,28 for independent operation.

Arithmetic logic unit 12 includes a shift register 42, a summer 44, an overflow detector 46, and an overflow correction 48. Arithmetic logic unit 12 further includes an accumulator 50, a buffer 52, a control 54 for shift register 42, and first and second buses 56 and 58 respectively.

Read buffer 20 is coupled to data memory 18 and to first and second buses 56 and 58 respectively by CMOS transfer gates 60 and 62 respectively. Such CMOS transfer gates are well known in the art and, as is well known, when activated, provide a low impedance path and when deactivated provide a high impedance path or isolation. Other such transfer gates referred to hereinafter will be referred to simply as transfer gates.

Write buffer 22 is coupled to data memory 18 and to first and second buses 56 and 58 respectively by transfer gates 64 and 66 respectively. Shift register 42 is preferably a unidirectional shift register for shifting multiple-bit data to the right by a number of bits responsive to the shift/mask control signals provided over bus 32. Unidirectional shift register 42 includes an input 68 which is coupled to first bus 56 by transfer gate 70. Input 68 is a multiple-bit input for receiving multiple-bit operand data from first bus 56. Unidirectional shift register 42 further includes a first control input 72 coupled to control 54 and a second control input 74 coupled to control 54. Lastly, unidirectional shift register 42 includes an output 76 which is a multiple-bit output for transferring multiple-bit operand data to a first input 78 of summer 44.

Summer 44, in addition to first input 78, includes a second input 80 which is coupled to second bus 58 by a transfer gate 82. Summer 44 includes a multiple-bit output 84 which is coupled to a multiple-bit input 86 of overflow correction 48.

Overflow detector 46 includes a first input 88 which is coupled to first input 78 of summer 44, a second input 90 which is coupled to second input 80 of summer 44, and a third input 92 which is coupled to output 84 of summer 44. Overflow detector 46 also includes an output 94 which is coupled to a control input 96 of overflow correction 48. Overflow correction 48 includes a multiple-bit output 98 which is coupled to a multiple-bit input 100 of accumulator 50 through a transfer gate 103.

Accumulator 50 is a multiple-bit accumulator wherein the most significant bit of the accumulator is preferably a sign bit for the multiple-bit operand data to be stored therein. Accumulator 50 includes an output 102 which provides the value of the sign bit of the multiple-bit operand data stored therein and a multiple-bit output 104 which is coupled to first bus 56 through a transfer gate 106.

Temporary buffer 52 includes a multiple-bit input 108 which is coupled to output 98 of overflow correction 48 through a transfer gate 110. Temporary buffer 52 further includes a multiple-bit output 112 which is coupled to second bus 58 through a transfer gate 114. Arithmetic logic unit 12 further includes multiplexer 116 which is configured and connected to form a two's compliment inversion control means. Multiplexer 116 includes a first input 118 coupled to output 102 of accumulator 50, a second input 120 coupled to control line 34, and an output 122 which is coupled to an input 124 of summer 44.

Multiplier section 26, in addition to being coupled to bus 30, includes an input 126 which is coupled to first bus 56 through a transfer gate 128, a second input 130 which is coupled to second bus 58 through a transfer gate 132, and an output 134 which is coupled to second bus 58 through a transfer gate 136.

Similarly, limit and quantization section 28, in addition to being coupled to bus 30, includes an input 138 coupled to first bus 56 through a transfer gate 140, another input 142 which is coupled to second bus 58 through a transfer gate 144 and an output 146 which is coupled to first bus 56 through another transfer gate 148.

Digital signal processor 10 performs operations upon multiple-bit operand data preferably containing up to nineteen bits wherein the most significant bit is the sign bit of the multiple-bit operand data and the remaining eighteen bits are available as magnitude bits. Also in accordance with this preferred embodiment, unidirectional shift register 42 is configured for shifting the multiple-bit operand data up to seven bits to the right and masking up to eight consecutive bits of the least significant bits of the multiple-bit operand data. Further, unidirectional shift register 42 is configured for forcing the sign bit of the multiple-bit operand data to a predetermined value of, for example, zero. Summer 44, in conjunction with multiplexer 116, is configured for adding an operand at its first input 78 to an operand at its second input 80, subtracting an operand at its first input 78 from an operand at its second input 80, and performing a two's compliment inversion operation upon an operand at its first input 78. In accordance with techniques known in the art, shift register 42 also sign extends the most significant bits of those operands which it shifts to the right.

It is to be understood that, while the detailed drawing and specific examples given describe preferred embodiments of the invention, they are for the purpose of illustration, that the apparatus of the invention is not limited to the precise details and conditions disclosed and that various changes may be made therein without departing from the spirit of the invention which is defined by the following claims:

What is claimed is:

1. An apparatus for processing data according to a plurality of instructions; the apparatus comprising:

a control means for controlling operation of the apparatus, said control means issuing said plurality of instructions in a bus system according to a predetermined program; said issuing being effected in a plurality of clock cycles, no more than one instruction of said plurality of instructions being issued in any respective clock cycle of said plurality of clock cycles;

a plurality of logical processing means for operatively responding to said plurality of instructions to perform logical processing of data according to predetermined logical relationships; each respective logical processing means of said plurality of logical processing means effecting said logical processing according to a respective said predetermined logical relationship;

each respective instruction of said plurality of instructions including a respective address information portion and a respective instruction information portion; at least a portion of said respective address portion designating a respective logical processing means of said plurality of logical processing means as an identified logical processing means, at least a portion of said respective instruction information portion providing operational details regarding said respective predetermined logical relationship effected by said identified logical processing means;

said bus system establishing operative connection among said control means and said plurality of logical processing means; said bus system including an address bus system and an instruction bus system; said address bus system communicating said address information portions of said plurality of instructions, said instruction bus system communicating said instruction information portions of said plurality of instructions;

at least one selected set of said logical processing means comprising at least two said respective logical processing means operatively responding to at least a portion of at least one predetermined said respective address information portion to perform said logical processing of data.

* * * * *